United States Patent [19]
Cloud et al.

[11] 3,904,148
[45] Sept. 9, 1975

[54] CONTROL FOR SELF-THREADING TAPE IN A HELICAL PATH

[75] Inventors: Samuel P. Cloud; Clement H. Kalthoff; William J. Rueger, all of Boulder; Timothy W. Thompson, Longmont, all of Colo.

[73] Assignee: International Business Machines Corporation, Armonk, N.Y.

[22] Filed: Apr. 25, 1974

[21] Appl. No.: 464,259

[52] U.S. Cl. ........................ 242/182; 226/1; 226/91; 242/191; 242/195; 360/85

[51] Int. Cl.$^{2}$ .......................................... B65H 17/32

[58] Field of Search .......... 226/1, 91; 242/182, 195, 242/191; 360/84, 85, 95

[56] References Cited

UNITED STATES PATENTS

| | | | |
|---|---|---|---|
| 3,127,120 | 3/1964 | Selsted | 242/195 UX |
| 3,473,042 | 10/1969 | Orlando | 242/195 UX |
| 3,613,977 | 10/1971 | Egan | 242/195 X |
| 3,643,889 | 2/1972 | Krause | 242/195 X |
| 3,797,776 | 3/1974 | Umeda | 242/195 X |

*Primary Examiner*—Richard A. Schacher
*Attorney, Agent, or Firm*—Homer L. Knearl

[57] ABSTRACT

A wide magnetic tape is self-threaded about a helical path containing a rotating head by pushing a tape along the channelized helical path. Electronic control of the supply motor, take-up motor, channel pneumatics and tape edge guides optimizes the threading of the helical path for speed and reliability. The supply spool acts as the pushing force on the tape to push the tape through the channelized path. Motion of the tape, including speed and position, is controlled as a result of sensing the position of the end of tape as it proceeds through the thread path and attaches itself to the take-up hub. The take-up hub is a vacuum hub to assist the attachment of the tape to the hub. Motion control of the tape during thread includes selection of speeds for different portions of thread operation including stopping and reversing tape motion to assist attachment of tape to the take-up hub and straightening of tape along the helical path.

10 Claims, 16 Drawing Figures

LOAD PATH

CONTROL FOR SELF-THREADING TAPE IN A HELICAL PATH

CROSS-REFERENCE TO RELATED APPLICATION

Filed simultaneously herewith is copending application Ser. No. 464,260 entitled "Push-Threading Tape in a Helical Path," invented by William J. Rueger. This copending commonly assigned application is directed to the threading apparatus shown in the present application. The threading apparatus is designed to permit a spool of tape to push magnetic tape along a constrained path to thereby self-thread the tape.

BACKGROUND OF THE INVENTION

Self-threading in the rotating head technology is not as highly developed as in the conventional ½ inch tape data processing tape recorders. This is undoubtedly due to the very circuitous nature of the path which must be threaded to wrap the tape about the rotating head.

Typically, threading tape about a rotating head has been accomplished by mechanically pulling the tape along the circuitous path.

This requires a special leader on the tape that may be engaged by the mechanism for pulling the tape through the path. Attaching a leader to a tape on the reel or spool is undesirable because it increases the cost of a reel of tape which is a large volume item for users.

A variation on mechanically threading tape is to mechanically lift the tape in a loop over the mandrel containing the rotating head. The lift arms are then retracted allowing the tape to collapse about the mandrel. Such a mechanism is complicated and expensive.

Another technique that has been used to self-thread about a rotating head is to retract the rotating head assembly along with its mandrel, balloon the tape into the desired tape path, and replace the rotating head mandrel assembly. Typically, the tape is ballooned into the tape path by use of a vacuum. Subsequently, after the mandrel and rotating head assembly have been replaced in the tape path, the vacuum is removed and the tape collapses onto the mandrel ready for read/write operations. The primary shortcoming of this method is that alignment of a mandrel/rotating-head assembly relative to the tape is critical in high-density recording. Therefore, any movement of this mandrel/rotating-head assembly between a retracted and an active position requires extremely expensive mechanisms to insure the accuracy of positioning of the mandrel/rotating-head assembly in the active position.

Yet another method of threading tape helically about a rotating head mandrel would be to channelize the path about the mandrel, place a strong vacuum on the take-up side of the mandrel, and then draw the tape through the channelized path about the mandrel with the vacuum. The shortcoming of this method is that the volume of air flow is such that strong fluttering of the tape end during threading usually occurs. Consequently, damage to the tape end over the period of a large number of threads can cause the tape to be unreliable in the threading operation.

It is the object of this invention to reliably, and simply, thread tape by pushing the tape through the constrained path and optimumly controlling the threading motion of the tape so as to maximize the speed of the threading operation, and at the same time to not compromise the reliability of the threading operation.

SUMMARY OF THE INVENTION

In accordance with this invention, the above object is accomplished by controlling the speed of the supply spool motor that is pushing the tape along the helical path during the thread operation. Further, the control of speed and motion of the tape end during threading operation is done in response to monitoring the position of the tape leading edge as the tape moves along the tape path and attaches to the take-up hub. while the end of tape is still in the supply spool cavity, the spool is driven at a backward speed to assist in confining the tape to the spool. When threading begins, a moderate forward speed is chosen to optimize reliable exiting of the tape from the supply spool cavity through a throat and into the tape path. Once the tape has entered the tape path, forward speed of the spool is increased to a speed more nearly maximum for reliable threading operation along the entire tape path. Speeds of the spool motor and take-up motor are then both adjusted to accomplish the attachment of the tape end to the take-up hub. During attachment, the spool motor is actually reverse-driven for a very short interval to provide a short jerk on the tape to collapse it about the take-up hub and pull it into a tighter confinement with the desired tape path. Further during attachment, when the spool motor is being driven for the short interval in reverse, the take-up motor is rapidly driven forward, and as a result, the tape end slips on the take-up hub and straightens itself on the hub relative to the desired tape path. Threading then proceeds by accumulating a small number of tape wraps on the take-up hub.

As further features of the threading, where mechanical edge guides and vacuum columns are desired, the control activates and deactivates both the edge guides and the vacuum column to optimize the threading operation. The vacuum column is not activated or turned on until after the end of tape has successfully been attached to the take-up hub. The take-up hub is then held fixed for a short interval while the spool motor feeds out a length of tape to load the vacuum column.

Mechanical edge guides would provide a serious physical barrier to pushing the tape along the channelized path during threading. Therefore, the control, when it detects the commencement of the thread operation by the beginning of tape being positioned in the tape path, the activates a solenoid to lift the guides away from the channelized path. As soon as the tape end has reached the take-up hub, but prior to attachment, the lift guide solenoid is deactivated, allowing the guides to edge guide the tape during the attachment of the tape to the take-up hub. By permitting the edge guides to be effective prior to attachment, the straightening of the tape to the desired tape path during attachment is enhanced.

The great advantage of our invention is the reliability by which tape may be threaded along a helical path. The threading operation can accomplish thousands of threads with minimal damage to the end of tape. Further, the tape leading edge need not have a specific shape or a stiff leader. The tape leading edge may merely be the end of conventional magnetic tape.

The foregoing and other objects, features and advantages of the invention will be apparent from the following more particular description of the preferred embodiment of the invention, as illustrated in the accompanying drawings.

PUSH-THREADING APPARATUS

Figures 1, 2:
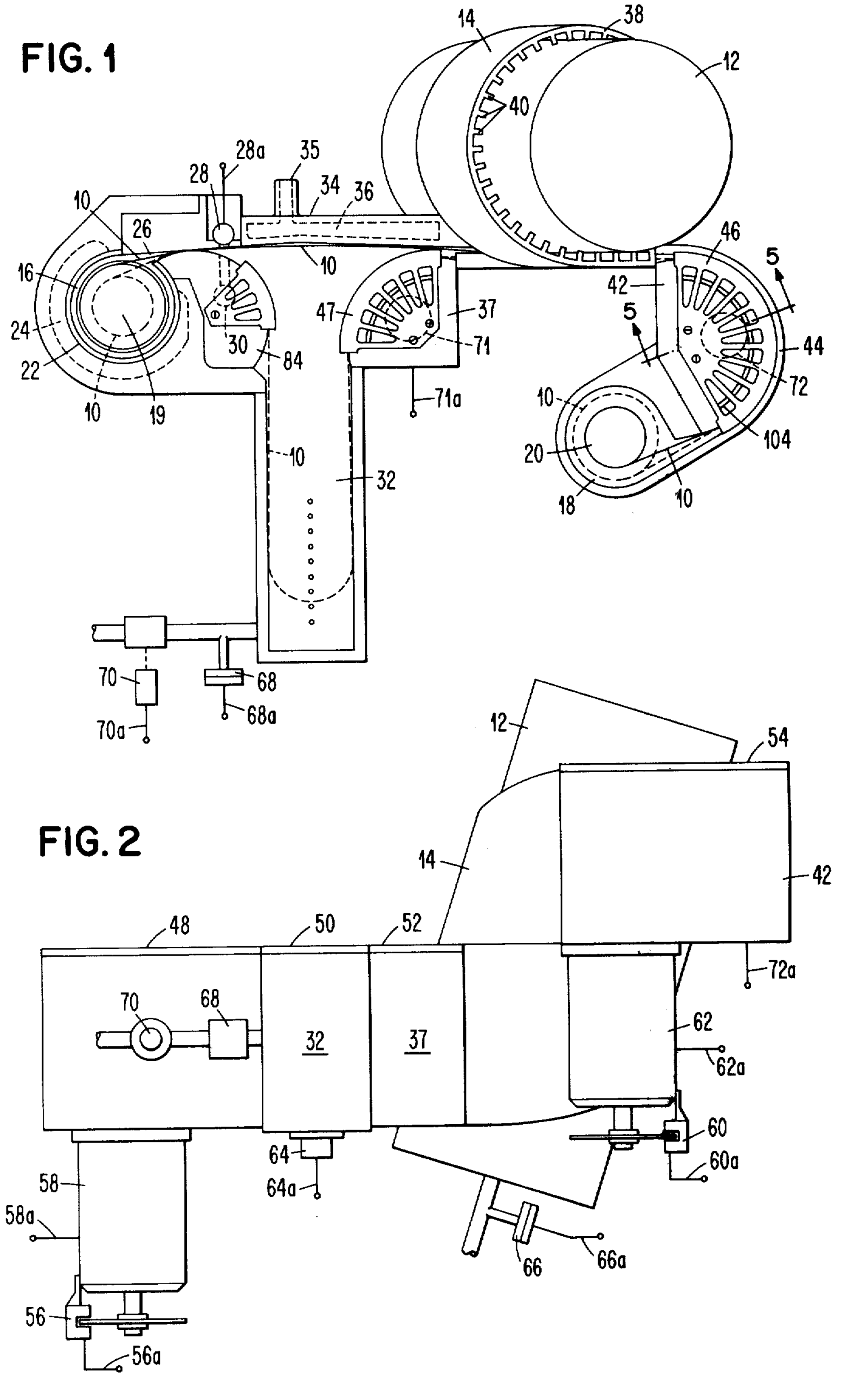
FIGS. 1 and 2 show top and front views of the apparatus used in the push-threading of the tape along the helical path, along with the sensors used to detect tape leading edge position and condition of pneumatics in the tape path.

Now referring to FIG. 1, mechanical elements of the push-threading apparatus are shown. The rotating head about which the tape 10 must be threaded is located in the middle of the mandrel 12. The rotating head is covered by the helical channel 14 which aids the threading of the helical path. A detailed description of the tape transport with the self-threading apparatus removed is in copending commonly assigned application Ser. No. 375,966, filed July 2, 1973, entitled "Tape Transport for Magnetic Recording with a Rotating Head," invented by P. J. Arseneault and E. P. Kollar.

As shown in FIG. 1, the push-threading apparatus is complete except that top covers have been removed from the vacuum column and the bearings, that preceded and succeed the mandrel 12, so as to more clearly show the internal apparatus. Side covers for the apparatus are shown in the front view of the transport, as depicted in FIG. 2.

Proceeding from the supply spool cavity 16 to the take-up cavity 18, the threading apparatus is constructed in the following manner. Note that in the threading apparatus tape 10 is depicted in solid lines when it has just completed attachment to take-up hub 20, and is depicted in dashed lines after it has been fully loaded and has been run forward most of its length onto the take-up hub.

Figure 3:
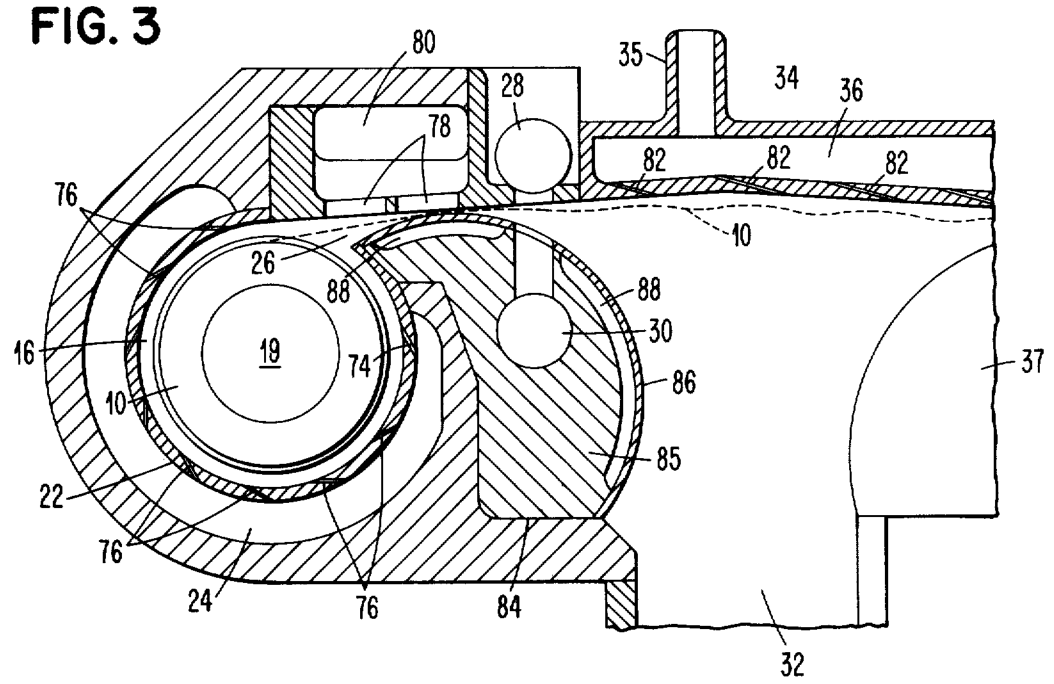
FIG. 3 is a detail of the tape path in the immediate vicinity of the supply spool where the tape leading edge must be picked off, exited through a confined throat into the tape path, and across a vacuum column.

The spool cavity 16 has an outer wall 22 which contains air jets connected to plenum 24. These air jets are shown in FIG. 3 and will be discussed subsequently with respect to FIG. 3. Their function is to introduce a large flow of air to hold tape in the spool 19 tightly on the spool rather than allowing it to uncoil as the spool unwinds tape. In other words, when the spool runs forward to supply tape, the tape is pushed out of the spool cavity 16 rather than uncoiling within the cavity. The push force is provided by spool 19 while the air flow prevents the tape from uncoiling in the cavity. An additional jet is provided near the throat 26 of the cavity 16 to peel off the leading edge of tape and introduce it into the throat 26 so that it may exit from the cavity into the tape path.

Positioned at the mouth of the throat 26 is an optical sensor 28 that picks up light from a light source 30 positioned on the opposite side of the tape. Thus, when sensor 28 is cut off from the light source 30 by the opaqueness of the tape, the optical sensor 28 indicates the tape has entered the tape path during the threading operation.

To carry the tape across the top of the vacuum column 32, air jets create a Bernoulli effect along the inner surface of top plate 34. These jets are shown in FIG. 3, to be described subsequently. A plenum 36 is supplied air under pressure via port 35 and provides air to the jets in the top plate 34. The jets direct a flow of air across the bottom surface of the top plate 34 such that when the leading edge of tape 10 enters the region of the vacuum column 32, the leading edge will be carried across vacuum column 32 from the throat 26 to the air bearing 37 and into helical channels 14 by the Bernoulli effect. While the air jets in the top plate 34 do have a forward component to assist the tape in moving across the top of the vacuum column, most of the forward pressure to push the tape across the top of the vacuum column is due to the supply spool 19.

Once the leading edge of the tape 10 enters the helical channels 14, it is guided by the channels around the mandrel 12. Motive force for moving the tape in the channels around mandrel 12 is the pushing force supplied by the supply spool 19. The pushing force from the supply spool is able to push-thread the tape because the tape is constrained in a path by the jets across the top of the vacuum column 32 and by the helical channels 14 around mandrel 12. The helical channel 14 has sidewalls 38 with posts 40 separated by open space. Channel 14 is preferably molded from plastic so that with the open space between posts 40, the channel is may easily be wrapped about the mandrel 12 to form the helical channel to guide the tape 10. Preferably, the corners of the leading edge of tape are rounded so they will not catch on one of the posts 40.

From the helical channel 14, the tape passes around air bearing 42 to the take-up spool 20. Tape is guided around the bearing 42 by channel 44. Compliant edge guide 46 for the tape is lifted out of the path of the tape by a solenoid inside the bearing 42 during the threading operation. Similarly, a solenoid 71 inside air bearing 37 lifts compliant edge guide 47 out of the path of the tape during threading.

As the leading edge of tape 10 enters the take-up cavity 18, it is attracted to the take-up hub 20 by a vacuum inside the take-up hub. Attachment of the leading edge of the tape to the take-up hub will be discussed in more detail subsequently.

In FIG. 2, the tape transport and threading apparatus of FIG. 1 are viewed from the front. Top covers 48, 50 and 52 are shown for the spool cavity 16, vacuum column 32 and bearing 37 respectively. Top cover 54 covers both bearing 42 and take-up cavity 18.

Figure 5:
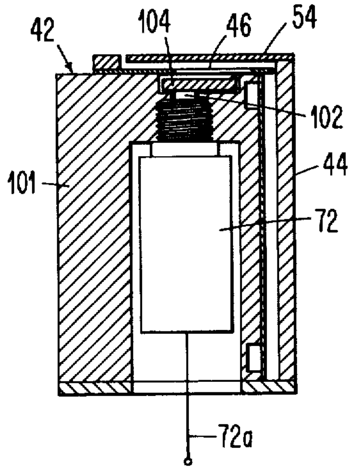
FIG. 5 shows a detail of a solenoid guide-lifter for lifting edge guides out of the tape path during threading.

Also shown in FIGS. 1 and 2 are various solenoid and sensor connections used by the electronics in controlling the threading operation. Of primary importance is the tachometer 56 attached to the spool motor 58. By monitoring the signal from the tachometer 56, the position of the leading edge of the tape can be detected during the threading and unloading operation. A tachometer 60 is also provided at the take-up motor 62 to sense movement of the take-up hub 20. Additional sensors include the optical tape sensor 28, shown in FIG. 1; the vacuum column tape loop position sensor 64, in FIG. 2; the mandrel pressure sensor 66, in FIG. 2; the column vacuum sensor 68, in FIGS. 1 and 2. Solenoids used during the control of the threading operation include the vacuum valve solenoid 70, and two lift guide solenoids 71 and 72. The lift guide solenoids are inside air bearings 37 and 42 respectively. One of the solenoids (solenoid 72) is shown in FIG. 5 to be described hereinafter.

The manner in which the supply spool is able to push the tape through the helical path is best understood by reference to FIG. 3. FIG. 3 is a section taken through the spool cavity 16, the throat 26 from the spool cavity to the top of the vacuum column and across the top of the vacuum column 32.

Spool 19 is automatically loaded into the spool cavity 16 by apparatus not shown. During the loading of the spool 19 into the spool cavity 16, the spool motor drives the spool in the reverse or backward direction. Backward direction is herein defined as winding the tape onto the spool, while forward direction is herein defined as winding the tape onto the take-up hub. The backward motion of the spool tends to keep the tape 10 tightly wrapped on the spool while the spool is entering the cavity 16.

When the start thread operation is initiated, the spool 19 is driven in the forward direction and an air jet 74 pointed in the direction opposite to forward motion picks the tape leading edge off the spool and directs it out the throat 26 of the spool cavity 16. Pressurized air for air jet 74 is supplied via the plenum 24.

To prevent the tape 10 from unspooling in the cavity when the spool 19 is rotating in the forward direction, a plurality of air jets 76 are spaced around the spool cavity 16 and are directed in the forward direction. These are not merely lubricating air jets to provide a film of air between the tape and the walls of the spool cavity 16. The function of the jets 76 is to provide a large volume of air flow directed forward and toward the spool so that the tape on the spool is constrained to wrap the spool rather than unspooling in the cavity 16 during forward motion of spool 19. This accounts for spool's ability to generate a force in pushing the tape through the helical path.

The nature of the air flow may best be understood by reviewing some of the physical parameters involved in the pushing of the tape by the spool 19. As shown in FIG. 3, the outside diameter of the last wrap of tape when the spool is fully loaded is approximately 4 centimeters. The inside diameter of the spool cavity 16 is approximately 4.6 centimeters. Accordingly, there is sufficient room for the tape to uncoil in the cavity during forward motion of the spool if the tape were not forced against the spool by the air jet 76. The volume of air flow applied to the plenum 24, which supplies the jets 76, is approximately 3 liters per second. From this data, it is clear that the flow of air in the spool cavity is very strong and is functioning to hold the tape on the spool so that the spool 19 may push the tape 10 through the helical path.

Another factor in the push-threading of the tape is the control of tape flutter so that the leading edge of the tape does not flutter so wildly that it might fold the tape into the vacuum column 32. As just pointed out, there is a large flow of air in the spool cavity. This flow of air could be vented through the throat 26 into the tape path by making the throat 26 larger. However, if this is done, the tape 10 will flutter with such a large amplitude that the leading edge may impinge on air bearing 37, and the tape will buckle into the column 32, rather than proceeding along the helical path. To control the flutter of tape 10 as it passes across the top of vacuum column 32, it is necessary to vent a large portion of the air flow from spool cavity 16. A plurality of holes 78 are spaced across the width of the throat 26 at the top of the throat near the spool cavity 16. These holes are spaced across the width of the tape so that a large percentage of the air flow in the cavity 16 is vented out the holes 78 and through port 80. Further, the throat 26 is constricted so that only a small percentage of the air flow in the cavity 16 passes through throat 26. Thus, the combination of the large air flow in the cavity 16 to hold the tape against wraps of tape on the spool 19, and the vents 78 and 80 to bleed off the air from the constricted throat 26, provide a condition whereby tape 10 can be pushed with substantial force by the spool 19 and yet will not have a large amplitude flutter.

Yet another factor in push-threading the tape is that the tape path through which the tape is being pushed must constrain the tape within that path, but not impede forward motion of the tape. Without constraint, the leading edge of the tape would have no direction. The constraints used are of two types. First, most of the path is surrounded by a channel that guides the leading edge of the tape as it is pushed along by the spool 19. Second, that portion of the path that must cross open space is constrained by jets that product a Bernoulli effect on the tape.

Referring again to FIG. 3, plenum 36 is pressurized to provide the air flow through for jets 82 that produce the Bernoulli effect. In operation the flow of air from the jets 82 across the top of tape 10 creates a lower pressure above the tape than below the tape. Vacuum column 32 is at normal atmospheric pressures during threading. Thus, the tape 10 is carried across the open spaced above vacuum column 32 by the Bernoulli effect produced by air jets 82. Of course, there will be come waviness in the tape due to the flow of air across the top of the tape. A small amount of flutter of the tape can actually enhance the passage of the tape through the helicala channel 14 (FIG. 1), since it will tend to prevent it from sticking to any particular portion of the channelized path.

Before leaving FIG. 3, some other elements will be described for background. First, the air bearing 84 is made up of a supporting core 85 to which a foil 86 is bonded. Foil 86 can be either porous or, preferably, has holes therein which interconnect to air pressure plenum 88. Air from air pressure plenum 88 flows through the foil 86 to provide the air bearing for the tape as it passes through throat 26 above foil 86. Further, when the tape is loaded in vacuum column 32, tape 10 wraps most of the bearing 84.

Finally, in FIG. 3 the position of the optical sensor 28 and light source 30 are shown. As discussed earlier, the function of the optical sensor 28 is to detect that the leading edge of the tape has exited the spool cavity and entered the tape path.

Figure 4A:
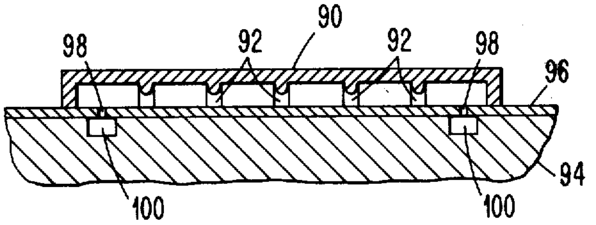
FIGS. 4*a* and 4*b* show alternative configurations for the channel that constrains the tape along its circuitous path about the rotating-head mandrel. The alternatives include a channelized path with or without ribs on the inner top surface of the channel.
Figure 4B:
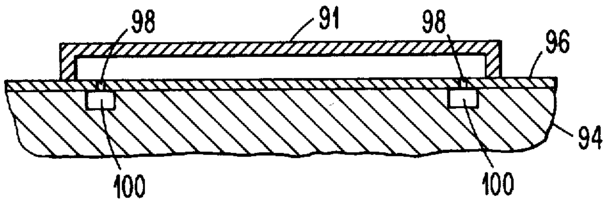

In FIGS. 4*a* and 4*b*, alternative configurations are shown for the channels that guide the tape as it is push-threaded. In the preferred embodiment in FIG. 4a, channel 90 has ribs 92 on its inner surface. The ribs 92 prevent the tape from making contact with a large area of the inner surface of the channel 90. Because of electrostatic charge, large area contact between the tape and the channel 90 can cause the tape to stick to the channel. Of course, if electrostatic charge is no problem, the channel may be implemented as channel 91 shown in FIG. 4b that contains no ribs.

Also shown in FIGS. 4a and 4b is the surface of air bearing 42. All surfaces including mandrel 12 (FIG. 1) and bearings 84 (FIG. 3) and bearings 37 and 42 (FIG. 1) along the tape path are air bearing. The air bearings are preferably implemented by providing a support member 94 to which a metal foil 96 is bonded. Foil 96 contains holes 98 in a predetermined pattern to provide the air bearing between the tape and the surface of the foils 96. Air is supplied to the holes 98 via the channels 100 in the support member 94.

As shown in FIG. 1, the air bearings 37 and 42 have compliant edge guides 46 and 47. To prevent these edge guidings from impeding the progress of the leading edge of the tape during threading, it is necessary to lift the guides 46 and 47 away from the edge of tape during the threading operation. In FIG. 5, solenoid 72 for lifting guide 46 is shown.

Solenoid 72 is mounted inside the support member 101 for air bearing 42. When the solenoid is not active, plunger 102 is retracted into the solenoid because of pressure from the compliant guide 46 via guide lifter 104. When solenoid 72 is activated, plunger 102 extends out from the solenoid, lifts the guide lifter 104 which in turn lifts the compliant edge guide 46. The leading edge of the tape will then pass around air bearing 42 and not be impeded by the edge force of guide 46.

CONTROL OF THREAD IN UNLOAD OPERATION

Figure 6:
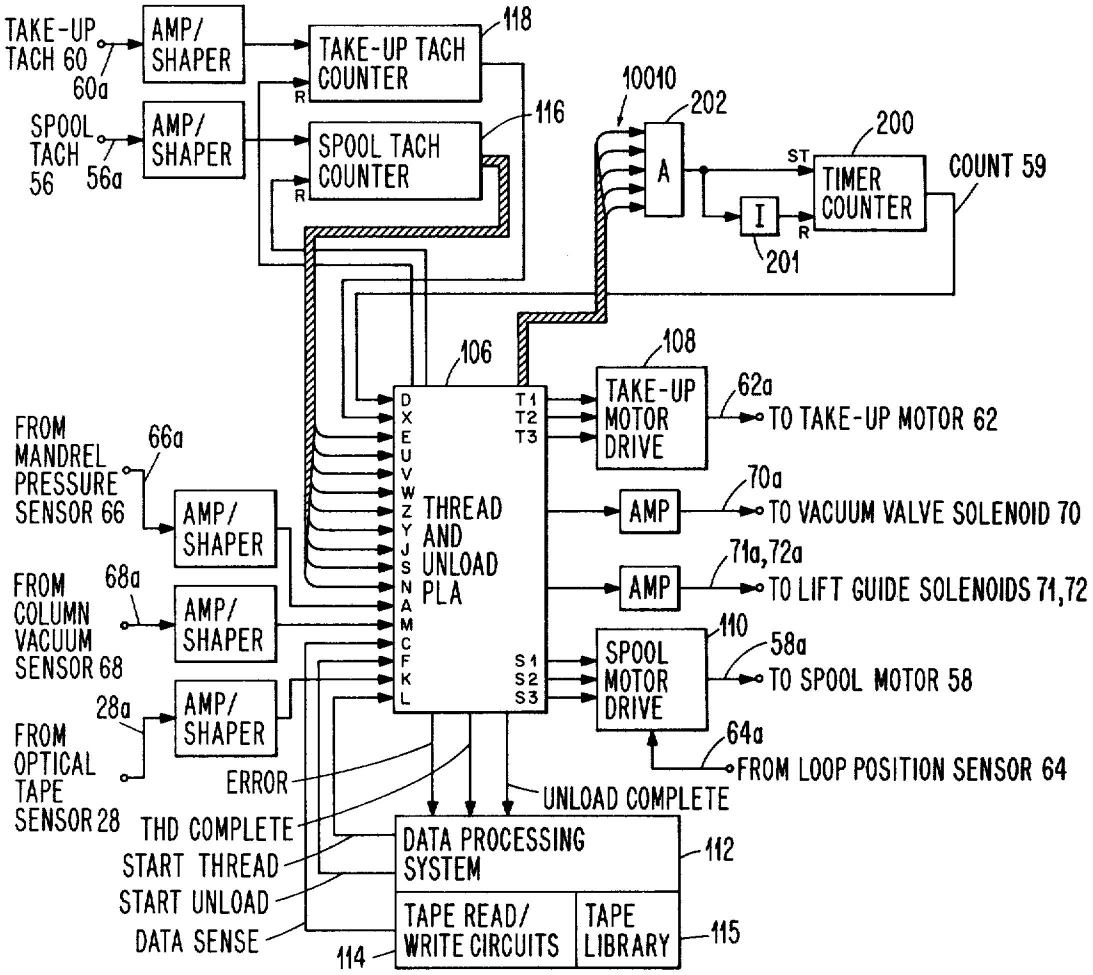
FIG. 6 shows a schematic block diagram of the electronic control for the threading operation.

A control system for the threading and unloading of the tape is shown in FIG. 6. Electrical connection between elements of FIG. 6 with elements of FIGS. 1 and 2 is shown schematically by the electrical line being given reference numeral plus suffix *a* of the element they connect to. For example, the electrical line that connects to optical sensor 28 is denoted 28*a*.

The heart of the control is the logic function performed by the thread and unload Programmable Logic Array (PLA) 106. The details of this array will be described hereinafter. However, before proceeding through the logic of the thread and unload operation, an overview of the system shown in FIG. 6 is necessary. PLA 106 receives stimuli on its left side, which are either from sensors associated with the tape path, or from command signals in the data processing system 112 that the tape transport is used with.

Command signals to PLA 106 include the start thread command or start unload command from data processing system 112, and the beginning of tape sense from the tape read/write circuits 114. The data processing system is responsible for monitoring the tape read/write circuits and the condition of the tape library 115 to load and unload spools into the spool cavity. It is the data processing system that then turns over control to PLA 106 to perform the thread and unload operations.

PLA 106 further receives input from the tape transport to indicate the condition of the transport and the position of the tape along the tape path. Probably most significant is the information received from the spool tach counter 116. The spool tach counter 116 monitors spool tach pulses 56 to determine the position of the leading edge of the tape by counting the amount of tape that has been unwound from the spool. Thus, the counts produced by the spool tach counter 116 correspond to distance moved by the leading edge of the tape. A take-up tach counter 118 is also used to detect movement of the take-up hub during the attach operation which will be described hereinafter.

Further sensors from the tape path include a signal from the mandrel pressure sensor 66. This signal is amplified and shaped and applied to the PLA to indicate that pressure is still present in the mandrel 12 of FIG. 1. A failure of pressure in the mandrel is used to trigger an error condition during the threading of tape. Mandrel pressure failure is dangerous to the tape, as it may cause excessive wear between the rotating head and the tape.

Other sensors in the tape path include column vacuum sensor 68 and optical sensor 28. Column vacuum sensor 68 produces a signal which is amplified and is shaped and applied to the PLA 106. This column vacuum signal indicates whether the vacuum column has successfully loaded a loop of tape in the column. Optical sensor 28 produces a signal which is amplified and shaped and applied to the PLA 106. As previously discussed, the optical sensor 28 indicates when the leading edge of tape is in the tape path.

The PLA, as a result of these inputs, generates signals to control the take-up motor drive 108, the spool motor drive 110, and signals to activate or deactivate the vacuum valve solenoid 70 and the lift guide solenoids 71 and 72. PLA 106 also produces control signals indicating an error condition has occurred during thread, that the thread is complete, or that an unload of the tape from the tape path is complete. These signals are passed to the data processing system 112.

Figure 7:
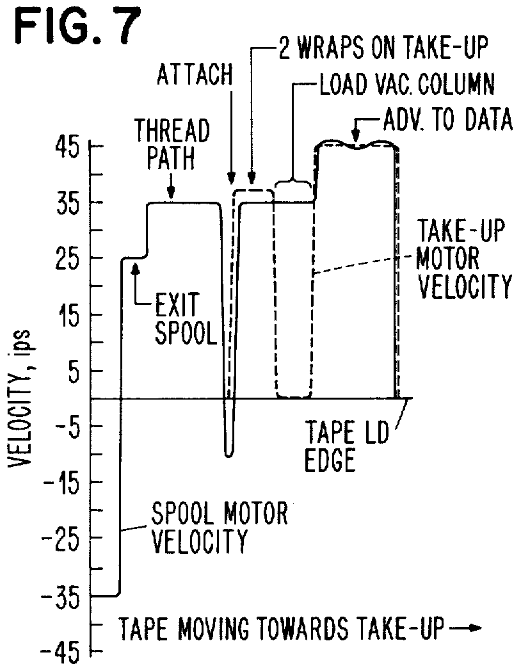
FIG. 7 is a speed profile of the supply and take-up motors as a function of tape leading edge position during the threading operation.
Figure 8:
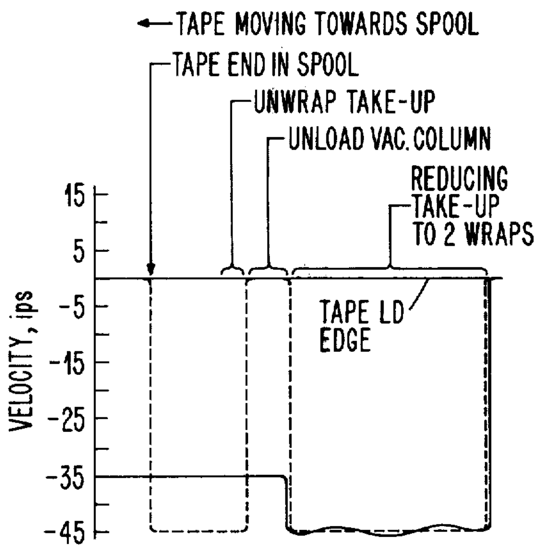
FIG. 8 is a speed profile of the supply and take-up motors as a function of tape leading edge position during an unload operation.

To complete the overview of the thread and unload operation of the tape, a speed profile curve for the spool motor and take-up motor is shown in FIGS. 7 and 8. The speed profile is a function of the distance of the tape leading edge from the spool. In both figures, the spool motor velocity is indicated by solid line, while the take-up motor velocity is indicated by dashed line.

The threading operation proceeds as follows, as depicted in FIG. 7. Initially, before the start of thread, the spool is moving at 35 inches per second in the negative or backward direction. This keeps the tape tightly wrapped on the supply spool. When the start thread command arrives from the data processing system, the spool motor changes to a positive 25 axis velocity, moving the tape forward. When the optical sensor 28 indicates the leading edge has exited the spool cavity, the forward tape velocity is increased to 35 inches per second, the compliant edge guides are lifted out of the tape path, and the tape is push-threaded about the helical path as described for FIGS. 1–5. When the leading edge of the tape has reached the take-up hub and wrapped approximately 270° about the hub (as defined by the spool tach count), the tape attach procedure is initiated.

The problem in attachment of the tape to the take-up hub is to assure that the tape is straight on the take-up hub and aligned with the desired tape path so that the take-up hub is not introducing unwanted dynamic perturbations in the tape movement. Accordingly, when the spool tach count indicates the tape leading edge has nearly wrapped the take-up hub, PLA 106 drops the edge guides previously lifted during the threading, and reverses the direction of the spool motor. The compliant edge guides have the effect of positioning the tape laterally on the tape path to its correct position.

Reversing the direction of the spool motor has the effect of pulling the tape backwards for a short interval to collapse the tape about the take-up hub and about its desired tape path on the mandrel 12 (FIG. 1). As soon as a backward motion of the take-up hub is sensed, the take-up motor is brought up to a forward speed of 37 inches per second. The spool motor is left for abrief interval in backward motion. The forward motion of the take-up hub, acting with the brief reverse motion of the spool motor, causes the leading edge of the tape on the take-up hub to slip relative to the take-up hub. This slipping allows the tape leading edge to properly align itself with the take-up hub.

After the spool motor has been reversed for the brief interval, it is returned to a forward velocity of 35 inches per second. The take-up hub at this point is moving at approximately 37 inches per second so as to maintain tension in the tape. After approximately two wraps of tape on the take-up hub, as measured by the spool tach counter, the take-up hub is stopped and the vacuum column is loaded with a loop of tape.

The vacuum column is loaded by activating the vacuum valve solenoid to apply a vacuum to the column. With the take-up hub stopped and the spool motor still running forward at 35 inches per second, a loop of tape will rapidly form in the vacuum column. When the spool tach count indicates a length of tape has been unreeled into the vacuum column, the take-up motor is turned on to a fast forward speed of 45 inches per second. The control of the spool motor is turned over to the loop position sensor in the vacuum column. Tape motion is now controlled by the take-up motor, and the speed of the spool motor will vary as it follows the take-up motor. When the tape read/write circuits sense the beginning of tape, which might be the beginning of data on the tape, the take-up motor, is stopped and the spool motor, in response to a loop position sensor, also stops. At this time a thread complete command is sent from the PLA 106 back to the data processing system 112.

The unload operation is depicted in FIG. 8. Note that since the horizontal axis is representative of tape leading edge position, movement on the speed profile is from right to left during the unload operation. When a start unload command is received from the data processing system, the PLA activates the take-up motor to drive backward or in reverse at 45 inches per second. The spool motor being under control of a loop sensor in the vacuum column will track the velocity of the take-up motor. The tape continues to move backward into the supply spool at this high rate of speed past the beginning of data, as sensed by the read/write circuits, until the spool tach counter counts out a distance indicating that approximately two wraps of tape remain on the takeup hub. At this point the take-up hub is stopped. Spool motor control passes to PLA 106, and its speed lowers to negative 35 inches per second.

At the same time, the vacuum valve solenoid is turned off so that the vacuum in the vacuum column disappears. With the take-up motor stopped and the spool motor operating at negative 35 inches per second, the loop in the vacuum column will be unloaded and wrapped onto the spool. When the spool tach count indicates the vacuum column has been unloaded, the take-up hub is brought back to a negative 45 inch per second velocity to finish unwrapping the last two wraps of tape off the take-up hub. Note that the velocity of the take-up hub is higher than the velocity of the spool at this point, so as to insure that there will be no tension in the tape impeding the unloading of the tape.

The spool motor continues to operate at negative 35 inches per second even after all of the tape has been rewound onto the spool. As stated earlier, this mode of operation of backward movement in the spool cavity tends to keep the tape tightly wrapped on the supply spool. The take-up hub motor is turned off when the leading edge of the tape has cleared the optical sensor 28, indicating the tape is back inside the spool cavity. With this background, as to the control of the threading and unload operation, it is now appropriate to examine the logical steps performed by the PLA 106 during the thread and unload operation.

THREAD AND UNLOAD PROGRAMMABLE LOGIC ARRAY

Figure 9:
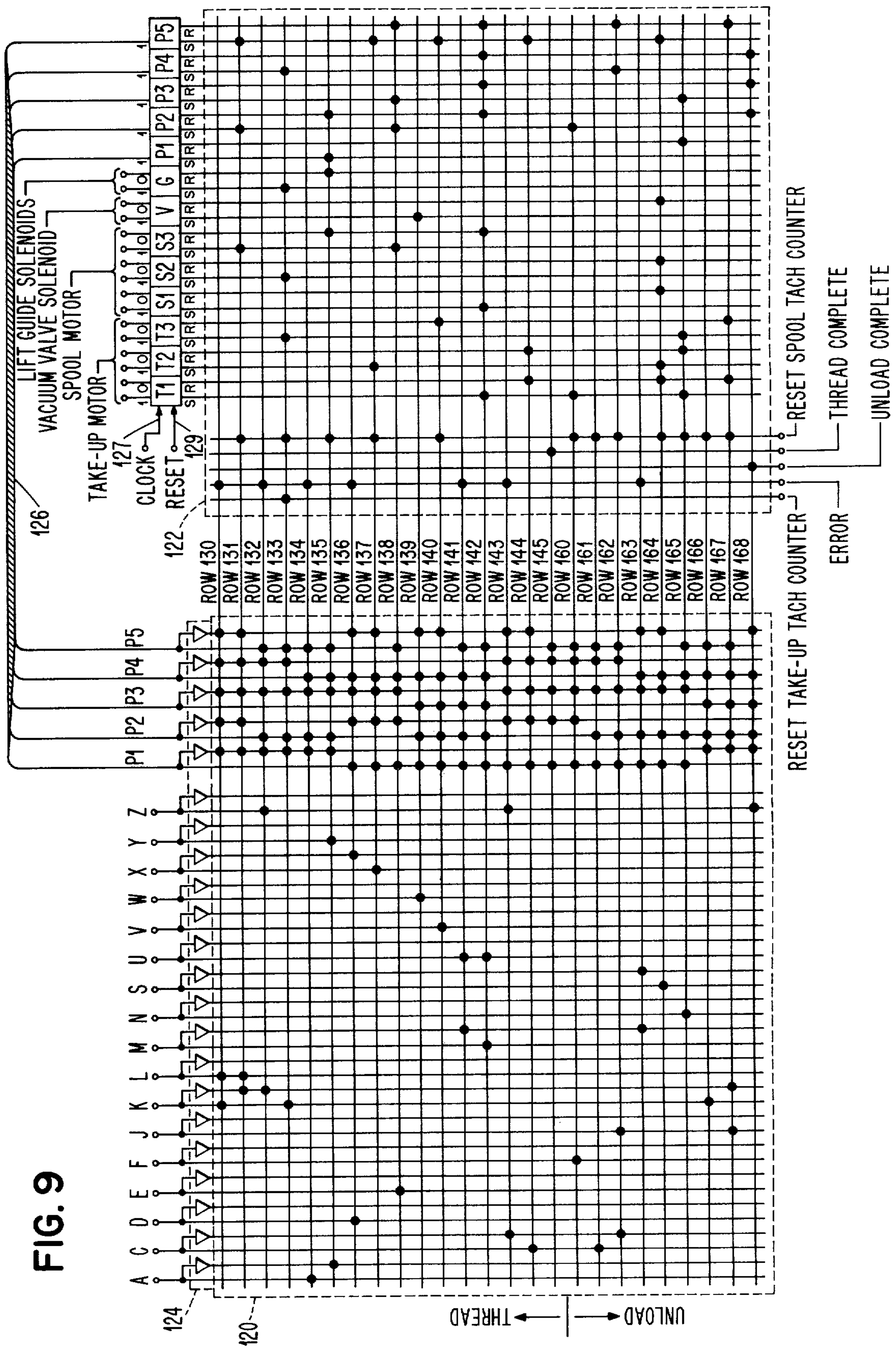
FIG. 9 shows the Programmable Logic Array (PLA) used in FIG. 6 to control the thread and unload operation.

An implementation of the thread and unload PLA 106 used in FIG. 6 is shown in FIG. 9. The PLA is of conventional design and contains a search array 120 and a read array 122.

The search array is set up so that inputs are applied to the top of the array. Each input is passed straight down a column of the array and at the same time it is inverted by invertors 124 and passed down an adjacent column of the array. For example, the first column of the search array is referred to as the A column, while the second column of the search array is the not-A column. The last five columns of the search array, denoted P1 through P5, represent feedback conditions from the read array. Output off of the search array is taken horizontally along a row and passed to the read array. Only one row will have an output to the search array for a given set of input and feedback conditions from the search array.

The output from the search array 120 is applied row by row to the read array 122. The first five columns of the read array are simply output columns. The outputs are taken off the bottom of the first five columns of the read array 122. The next sixteen columns of the read array are set/reset columns for flip-flop outputs from the read array. From left to right the first three flip-flops T1, T2, and T3 control the take-up motor; the next three flip-flops S1, S2, and S3 control the spool motor; the seventh flip-flop controls the vacuum valve solenoid 70 (FIG. 1) for the vacuum column; and the eighth flip-flop controls the solenoids to lift guides 46 and 47 (FIG. 1). The last five flip-flops P1-P5 control the flow of logic performed by the pLA by feeding back over cable 126 the conditions P1-P5 as a program control word to the last five columns of the search array 120. All flip-flops T1 through P5 are cyclically updated by gating their set/reset inputs with clock pulses over clock line 127. Also, all the flip-flops may be initially reset by reset line 129.

To review, the PLA operates by having conditions A–Z on the input lines logically combined with the program control word P1–P5 to select a given row that has an otput from the search array 120. This output from the search array activates a row in the read array 122. Outputs are taken off the columns of the read array and consist of either of the five outputs at the bottom of the read array or the setting or resetting of the first eight flip-flops at the top of the ready array. Further, the excitation of a row in the read array 122 causes the setting of a particular program control word in the P-P5 flip-flops. This control word is fed back via cable 126 to the search array where it controls the next row on the search array that will have an output.

Figure 10:
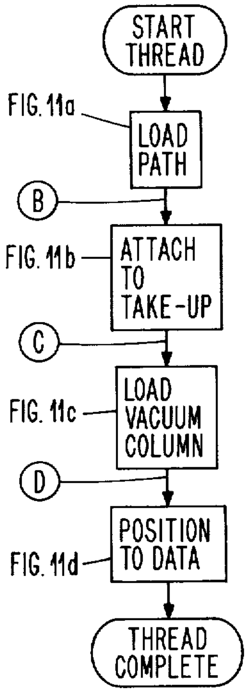
FIG. 10 is a schematic block diagram of the flow of control in the PLA for the thread operation.
Figure 11A:
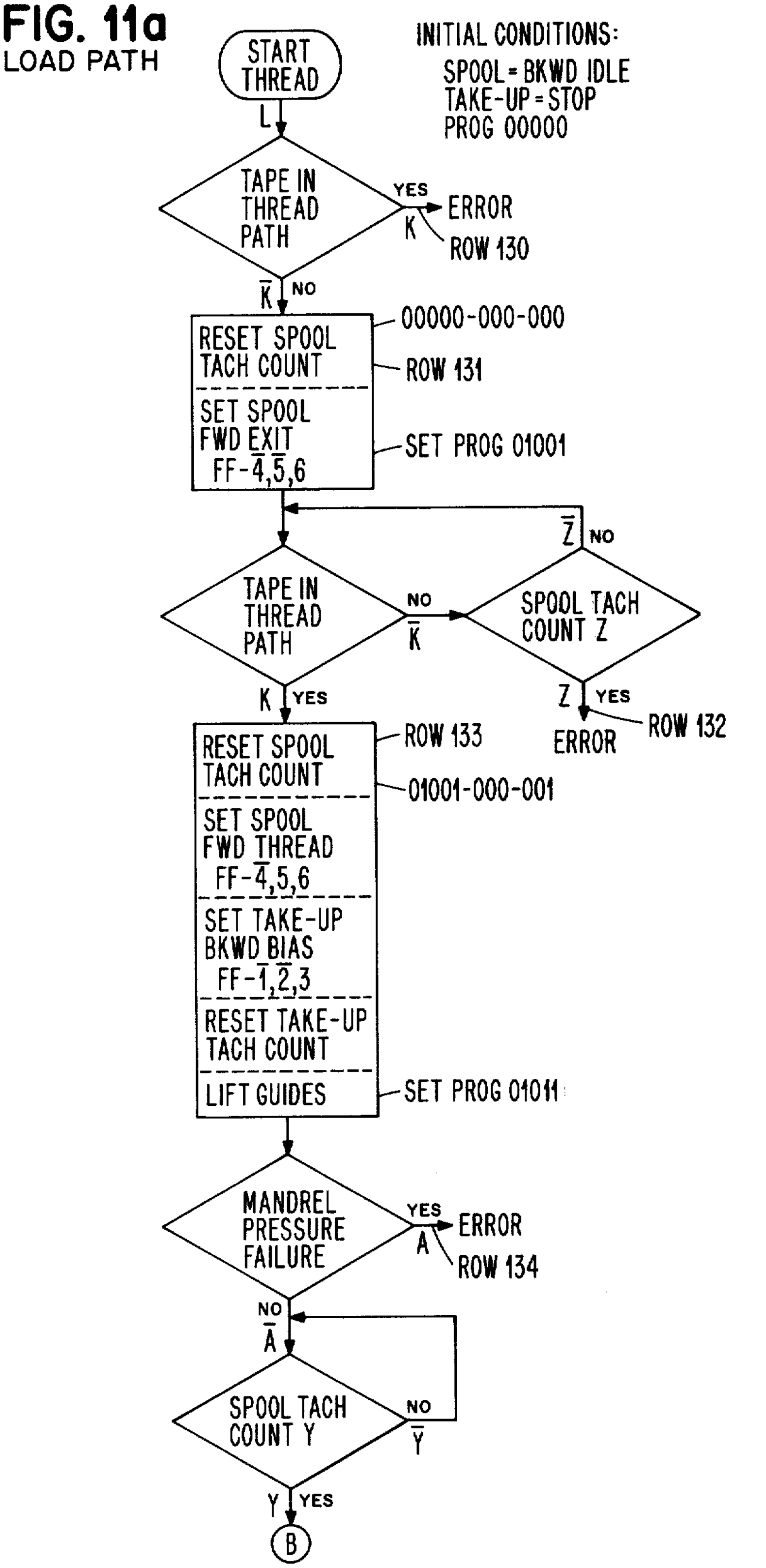
FIGS. 11a through 11d show the details of the logid flow for the PLA during threading operation.
Figures 11B, 11C, 11D:
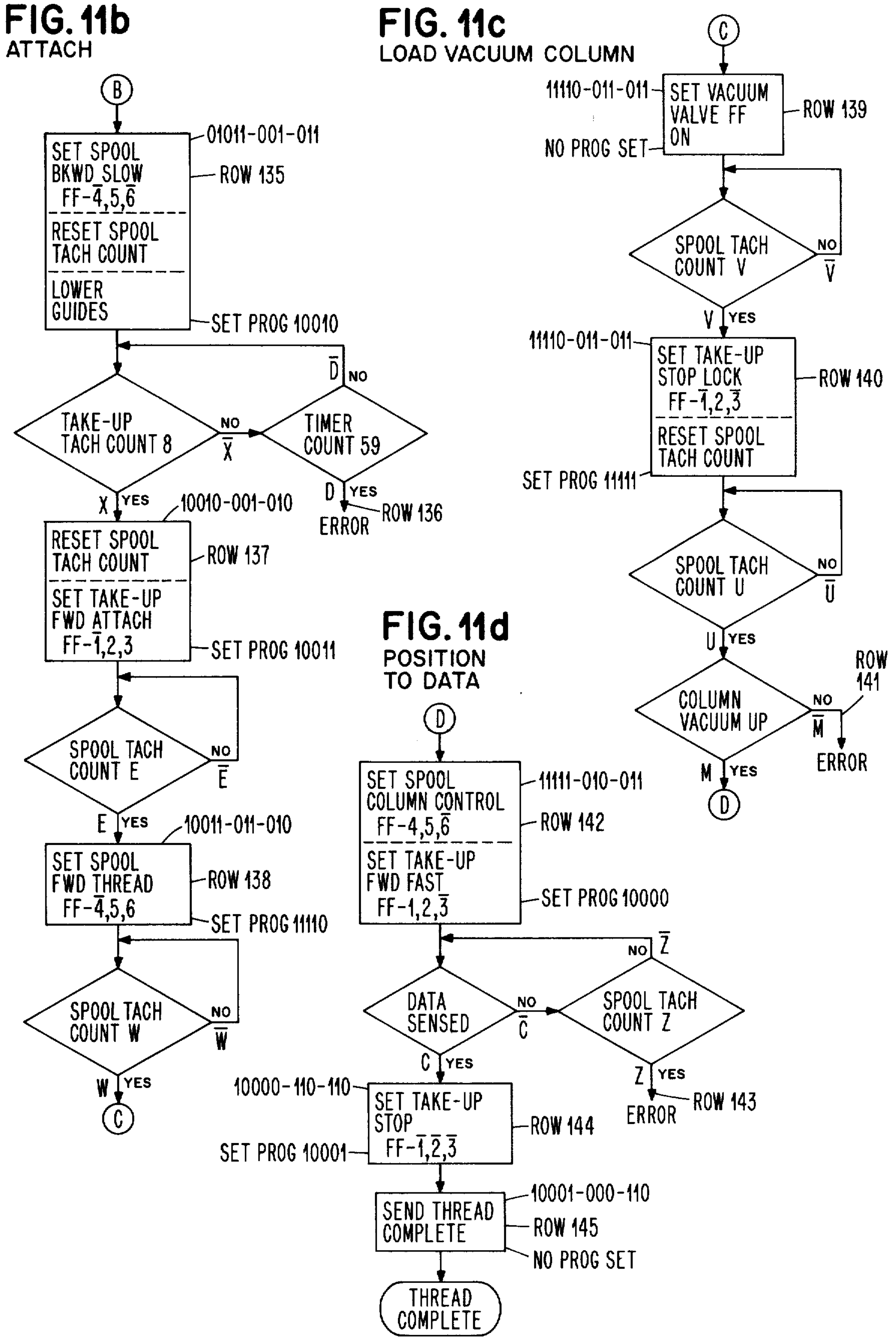
Figure 12:
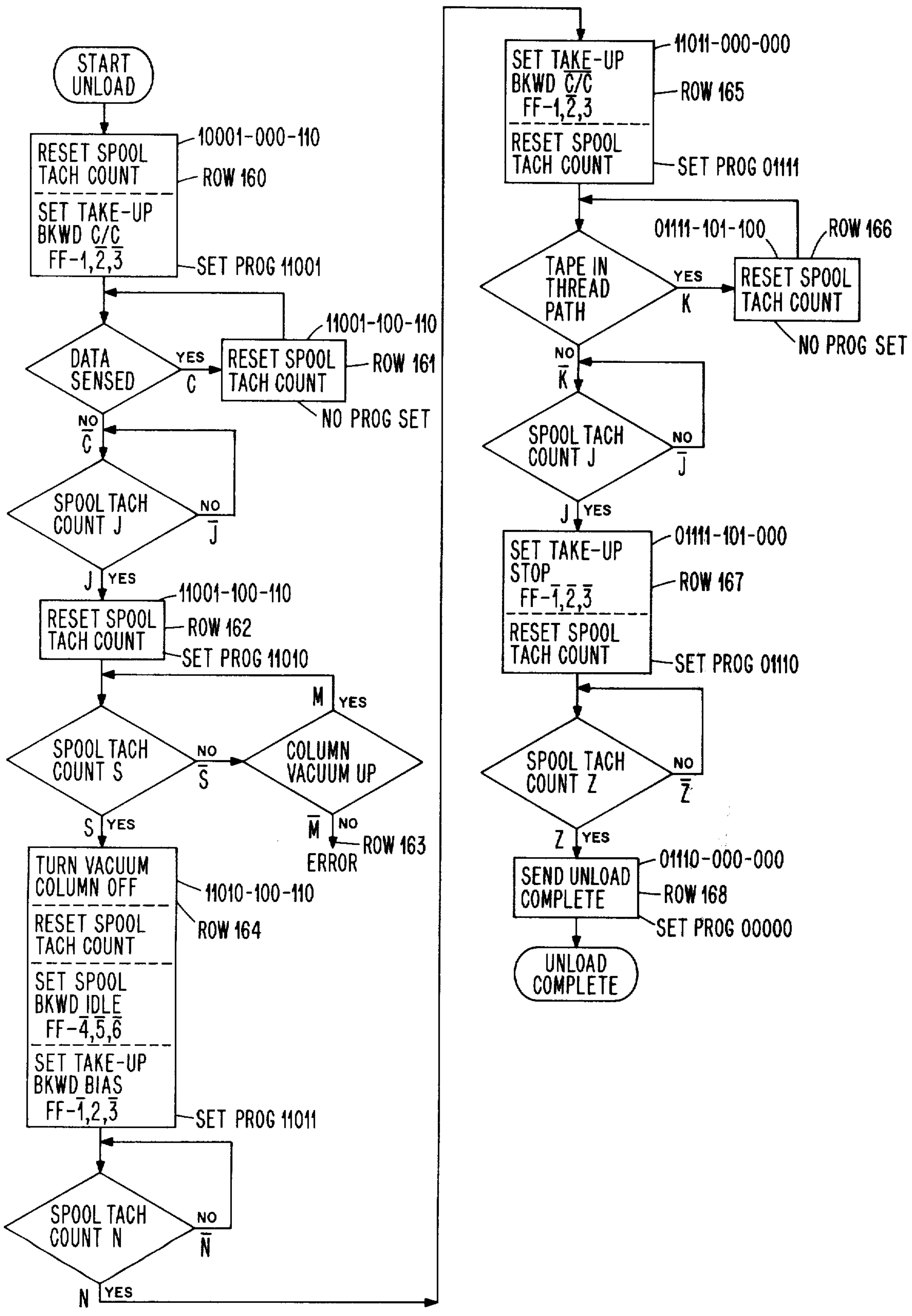
FIG. 12 shows the details of the logic flow in the PLA during the unload operation.

The operation of the PLA in FIG. 9 can be better understood by referring also to the logic flowcharts in FIGS. 10, 11 and 12. The conditions A–Z that are inputs to the search array are identified in the logic flow as commands or outputs of decision blocks. Each error output and process block in the logic flow diagrams corresponds to a row in the search and read array. Error recovery procedures are not a part of this invention and are not shown. Error recovery could be automatic or might simply consist of shutting down the system until it can be serviced.

At the top of each process block is a series of eleven digits grouped 5–3–3. The first 5 digits indicate in binary notation the program control word. The next three digits indicate the take-up motor speed code, and the last 3 digits indicate the spool motor speed code. These codes are present as the logic flow enters the process block. At the bottom of each process block the five-digit code indicates the new program control word set by the process block. To further coordinate PLA, FIG. 9, with the logic flow in FIGS. 11 and 12, each row in the PLA has been given a number. Logical operations in FIGS. 11 and 12 have been identified by the same row number.

With the above background, the logical flow of the PLA will now be described. FIG. 10 shows the interconnection of FIGS. 11a through 11*d* that form the logic flow for the thread operation. Referring now to FIG. 11*a*, a start thread command in combination with the decision as to whether the tape is in the thread path will either satisfy row 130 or row 131 of the PLA. The program control word P1–P5 is all zeroes, the start thread command signal present is L, and whether the tape is in the thread path is either K or not-K condition. Information as to the K or not-K condition is provided by optical sensor 28 (FIG. 1). Row 130 is FIG. 9 corresponds to a start thread command when tape is already in the tape path. For row 130, the output from the read array is an error condition. For row 131, a start thread command with tape not in the tape path indicates correct operation and process block corresponding to row 131 is executed in the read array. Namely, the read array puts out a signal to reset the spool tach counter, and also sets the spool motor speed to forward exit. Finally, row 131 sets the program control word to 01001.

Program control word 01001 corresponds to rows 132 and 133 in the PLA. If the tape leading edge does not pass the optical sensor 28 (FIG. 1) before the spool tach count reaches Z, row 132 will have an output and activate the error line in the read array. On the other hand, if the leading edge of the tape does enter the tape path as indicated by the K condition, row 133 is satisfied and will perform in the read array the steps indicated for row 133 in FIG. 11a. In particular, row 133 when active resets the spool tach counter, sets the spool motor speed to forward thread, sets the take-up motor speed to backward bias, resets the take-up tach counter and activates the lift guide solenoids. As previously discussed with regard to FIG. 7, the tape leading edge is now moving forward in the threading path at approximately 35 inches per second. The take-up motor, in a backward bias condition, is not moving. However, backward bias means that it is being driven electrically to a point where friction in the motor is overcome and the take-up hub would easily move if an external force were applied to it in the backward direction. Finally, row 133 sets the new program control word 01011, which corresponds to rows 134 and 135 in the PLA.

Row 134 checks to see if mandrel pressure has failed. If pressure has failed in the mandrel, row 134 is satisfied and an error condition will be indicated on the error output line of the read array. If mandrel pressure has not failed, logic flow continues and row 135 checks to see if the spool tach counter has reached a count of Y. A count of Y in the spool tach counter corresponds to the tape having been unspooled enough to reach through the entire thread path and approximately 270°around the takeup hub. When the Y and not-A conditions have been met, row 135 out of the search array becomes active and the logic flow has now entered FIG. 11*b* where the process steps performed by row 135 are indicated.

The read array in row 135 sets the spool motor to backward slow, resets the spool tach counter, resets the lift guide flip-flop thereby lowering the guides, and sets the program control word to 10010. Note that the guides 46 and 47 (FIG. 1) have been lifted out of the way during the thread operation, but have now been placed back into operative position so that the tape will be properly positioned during attachment of the leading edge of the tape to the take-up hub. Program control word 10010 corresponds to row 136 and 137 in the PLA.

Backward movement of the tape, as caused by the spool motor moving backward slow, causes the tape to collapse against the take-up hub and to be pulled against the air bearings of the tape path so that the tape is approximately in its desired tape path. Row 136 is checking to see that the take-up tach counter has been moved back 8 counts indicating the leading edge of the tape has attached itself to the vacuum take-up hub and rotated the hub. Row 136 is checking to see that this indication occurs before that timer counts out 59 counts corresponding to approximately one second. If the attachment indication does not occur in that time interval, row 136 is satisfied and an error indication appears as an output from the read array.

The timer used for this time-out operation is shown in FIG. 6 as a free-running timer counter 200, which is held reset to zero by inverter 201, except when the program control word is 10010, as detected by AND gate 202. This condition detected by AND gate 202 starts the timer counter 200 running, and when count 59 is reached, a D condition signal is applied to the input of the search array in the PLA 106. This satisfies row 136

(FIG. 9) of the PLA and causes generation of an error signal by the PLA.

On the other hand, if the take-up tach count reaches 8 before the time-out occurs, row 137 is satisfied and performs the functions indicated for row 137 in FIG. 11b. In the read array row 137 resets the spool tach counter and sets the take-up motor to forward attach speed (37 inches per second as shown in FIG. 7). Finally, row 137 sets the program code to 10011.

Program control word 10011 corresponds to row 138 in the PLA. Row 138 is looking for a spool tach count of E. At this time the take-up hub is rotating rapidly forward while the tape itself is being pulled slowly backward by the spool motor. The effect is to cause the tape leading edge to slip on the take-up hub, and thereby straighten itself on the take-up hub. By the time the spool motor has wound the tape backwards for an E count, the leading edge of the tape will be straight on the take-up hub. Row 138 in the search array is then satisfied, and the read array sets the spool motor to forward thread speed (35 inches per second in FIG. 7). Row 138 also sets the program control word to 11110.

Rows 139 and 140 contain the control word 11110. When the spool tach count reaches a W count, row 139 is satisfied in the search array. This corresponds to one and one-quarter wraps of tape being wrapped on the take-up hub, and is indicative of the completion of the attach procedure in the threading operation. Row 139, as called for in FIG. 11*c* and shown in the read array, then sets the vacuum valve flip-flop on. This causes the vacuum valve itself to become active applying a vacuum to the vacuum column 32 (FIG. 1). Row 139 performs no program set.

The take-up motor and the spool motor continue to move forward as the vacuum builds up in the vacuum column 32. When spool tach count reaches a count of V, row 140 is satisfied in the search array and performs in the read array the functions indicated in FIG. 11c. Row 140 sets the take-up motor to a stop lock condition, resets the spool tach count to zero, and sets the program control word to 11111.

With the take-up hub stop-locked and the spool motor still moving, and a vacuum on in the vacuum column, a loop of tape will be loaded into the vacuum column 32 (FIG. 1). Rows 141 and 142 contain the program control word 11111. Row 141 looks for a spool tach count U and a failure in the pressure of the vacuum column. If these conditions are met, row 141 is satisfied in the search array, and the read array has an error signal on the error output line.

On the other hand, if the spool tach count indicates a count of U, and the vaccum in the vacuum column has come up, then row 142 is satisfied in the search array indicating the vacuum column has been successfully loaded. The U count of course indicates the amount of tape necessary to make a tape loop in the vacuum column.

With row 142 satisfied in the search array, the load vacuum column operation is completed and row 142 is active in the read array to perform the functions shown for row 142 in FIG. 11*id*. Row 142 sets the spool motor to column control and sets the take-up motor to forward fast. In FIG. 7 this corresponds to the take-up motor operating at 45 inches per second, and the spool motor tracking that speed as a result of being controlled by the loop sensor in the vacuum column. Row 142 also sets the program control word to 10000.

Rows 143 and 144 in the PLA contain the control word 10000. If the beginning of data on tape is not sensed within a tape length Z as counted by the spool tach counter, row 143 in the search array is satisfied. Row 143 will then produce an error output out of the error line in the read array. On the other hand, if the beginning of data is sensed before the spool tach count reaches Z, row 144 is satisfied in the search array. As shown in FIG. 11d, row 144 in the read array sets the take-up motor to stop and sets the program control word to 10001. Thus, the threading of the tape has been completed, and the take-up motor has been stopped. Because the spool motor is operating under control of the tape loop in the vacuum column, the spool motor also stops.

The new program control word set by row 144 feeds back control to row 145 in the search array, which has no other input conditions. Therefore, row 145 is satisfied in the search array and activates row 145 in the read array. Row 145 in the read array generates a pulse output on the thread complete line in the read array, and there is no further program control word set. Threading of tape, as controlled by the PLA, has now been completed.

The unload operation, as controlled by the PLA, starts with row 160 in the PLA. The logic flow for the PLA during unload is shown in FIG. 12.

The unload operation is initiated by a start unload command which, in combination with the program control word 10001, satisfies row 160 of the search array. As documented in FIG. 12, row 160 in the read array resets the spool tach counter to zero, sets the take-up motor to backward column control. Take-up backward column control refers to the takeup motor moving backward at 45 inches per second, and the spool motor following under column control. In addition, row 160 also sets the program control word 11001. The function of row 160 is to unwind tape from the take-up hub back to the spool as rapidly as possible while controlling tension in the tape with the vacuum column.

Row 161, which contains the new program control word 11001, monitors the read/write circuits 114 (FIG. 6) for the presence of a data signal. So long as the data signal continues to be present, row 161 continues to reset the spool tach counter.

Row 162 also contains the program control word 11001 and looks for data signal no longer present from the read circuits and a spool tach count of J after the data signal has dropped out. Row 162 then resets the spool tach counter and sets the program control word to 11010. The J count by the spool tach counter, after data drops out, is merely a guard band for a short interval to be sure that the data signal has definitely dropped out. If the data signal were to reappear before the spool tach counter reached J count, then row 161 would again reset the spool tach counter.

The new program control word 11010 passes control of row 163 of the search array in PLA. Since row 162 was satisfied, the only tape remaining in the tape path amounts to the difference between beginning of data on tape and tape leading edge. Row 163 monitors the spool tach count for an S count indicating the remaining length of tape has been rewound except for the length in the path plus approximately two wraps about the take-up hub. While row 164 is looking for the S count from the spool tach counter, row 163 is monitoring the vacuum in the vacuum column 32 (FIG. 1). If the vacuum in the vacuum column were to drop out before the spool tach counter reached S count, row 163 in the search array would be satisfied. An active row 163 produces an output in the read array on the error line.

If the spool tach count does reach S, and the logic flow has not been diverted by row 163, then row 164 in the search array is satisfied and activates row 164 in the read array. As documented in FIG. 12, row 164 in the read array resets the vacuum column valve flip-flop thereby turning off the vacuum in the vacuum column 32 (FIG. 1). Further, row 164 resets the spool tach counter, sets the spool motor to backward idle, and sets the take-up motor to backward bias. Backward idle for the spool motor is negative 35 inches per second as shown in FIG. 8. Backward bias for the take-up motor means no backward motion, but enough backward drive bias to let the take-up motor freely rotate as the tape is pulled off of the take-up hub. Finally, row 164 sets the program control word 11011 passing control to row 165 of the PLA.

With the spool motor moving at 35 inches per second backward, and the take-up hub not moving except as the tape pulls on it, and finally with the vacuum in the vacuum column being turned off, the spool motor will effectively begin to pull the loop out of the vacuum column and wind it onto a spool. When the spool tach counter reaches a count of N, indicating a length of tape sufficient to unload the vacuum column, row 165 in the search array is satisfied.

An active line on row 165 in the read array forms the functions as indicated in FIG. 12 for row 165. First, the take-up motor is set to a speed called backward not-column control, and the spool tach counter is again reset. The speed backward not-column control refers to the fact that the take-up hub is now running at negative 45 inches per second, but the spool motor is no longer controlled by the tape loop sensor in the vacuum column. Thus the spool motor is running at negative 35 inches per second, while the take-up hug is running at negative 45 inches per second. Since the take-up hub only has about two wraps of tape on it at this time, this difference in speed will not cause the tape to bunch up in the tape path.

With the program control word set to 01111 by row 165, program control passes to rows 166 and 167. Row 166 monitors the optical sensor 28 (FIG. 1) to detect the presence of the tape in the tape path. So long as the tape remains in the tape path, row 166 in the search array is active and causes the read array to generate a reset spool tach count signal. After the tape leading edge moves past the optical sensor 28 towards the spool, row 167 monitors the spool tach count for a count of J. The count J is small but sufficient to make sure that the optical sensor truly detected the passage of leading edge of tape and didn't momentarily fail.

With row 167 in the search array satisfied, the read array is activated by row 167 to stop the take-up motor and reset the spool tach count. Further, row 167 sets the program control word to 01110. This program control word passes program control to row 168 in the PLA.

Row 168 monitors the spool tach count for a Z count. A count of Z is sufficient to insure that the leading edge of tape has completely entered the spool cavity and is wrapped on the spool. When the count of Z occurs, row 168 in the search array is satisfied. The active row 168 in the read array then puts out a signal on the unload complete column of the read array. This unload complete signal is passed to the data processing system 112 (FIG. 6). Row 168 further sets the program control word to 00000. Thus the program control word is ready to start the thread operation again at row 130 when commanded by the data processing system. With the operation of row 168 in the PLA the unload sequence is completed.

It will be appreciated by one skilled in the art that alternative PLAs could be designed to implement the threading and unloading sequences. It will further be appreciated by one skilled in the art that depending upon the hardware configuration, the speeds of the tape might be adjusted for optimum operation without departing from the spirit and scope of the invention as claimed hereinafter.

What is claimed is:

1. Apparatus for controlling the self-threading of magnetic tape about a rotating magnetic head through a channelized thread path that wraps at least a portion of the path of the rotating head, said apparatus comprising:

means for pushing the tape from a supply spool through the thread path to a vacuum-attach take-up hub;

means for sensing the passage of the tape leading edge from the spool to the entrance in the thread path;

means connected with the spool and responsive to said sense means for counting degrees of rotary motion by the supply spool whereby the length of tape pushed from the spool into the thread path, after the tape leading edge is sensed by said sense means, may be metered as the tape is pushed along the thread path;

means connected to said counting means for controlling said pushing means to vary the speed and direction of motion of the tape through the thread path and during attachment to the take-up hub as a function of tape leading edge position in the thread path.

2. The apparatus of claim 1 wherein said controlling means comprises:

means for setting said pushing means to push the tape at forward exit speed when said sensing means indicates the tape leading edge has not left the spool;

means for setting said pushing means to push the tape at forward thread speed when said sensing means indicates the tape leading edge has entered the thread path;

means for aligning the tape with the take-up hub for vacuum attachment to the hub when said counting means indicates the tape leading edge has at least partially wrapped the take-up hub.

3. The apparatus of claim 2 and in addition:

means for lifting tape edge guides out of thread path when said sensing means indicates the tape leading edge has entered the thread path;

means for lowering the edge guides back into the thread path when said counting means indicates the tape leading edge has at least partially wrapped the take-up hub.

4. The apparatus of claim 2 wherein said means for aligning comprises:

means for reversing said pushing means to pull the tape at backward slow speed when said counting means indicates the tape leading edge has at least partially wrapped the take-up hub; means connected to the take-up hub for indicating rotary motion by the take-up hub; means for setting the rotary speed of the take-up hub to forward-attach when said indicating means indicates that the tape partially wrapping the take-up hub has pullsed the take-up hub backwards; means for setting said pushing means to push the tape at forward thread speed after a short interval whereby during said interval the tape is moving backward slow and the take-up hub is moving at forward-attach so that the tape slips on the take-up hub and is aligned with the hub and after said interval the tape begins to wind onto the take-up hub.

5. Method for controlling the threading of a web through a circuitous path where the motive force for moving the web is the rotation of the web supply spool and where guidance of the web leading edge through the circuitous path is provided physically or pneumatically, said method comprising the steps of:

driving the spool forward at exit speed to push the web into the circuitous path;

sensing when the web leading edge has left the spool and entered the path;

driving the spool forward at thread speed after sensing the web leading edge has entered the thread path to push the web as rapidly and reliably as possible through the circuitous path to a vacuum take-up hub;

sensing when the web leading edge is adjacent the vacuum take-up hub;

driving the spool and take-up hub in opposite directions to slip the web relative to the hub and align the web on the hub after the leading edge is adjacent the hub;

driving the spool and take-up hub forward after the web is aligned with the hub to wind a few wraps of the straightened web onto the vacuum take-up hub whereby the web is attached to the hub.

6. The method of claim 5 wherein the steps of sensing the position of the web leading edge include:

monitoring the entrance of the circuitous path to detect the presence of the web;

counting the length of web unwound from the supply spool so that the position of the web leading edge in the thread path is defined by a count.

7. The method of claim 6 and in addition the steps of:

lifting web edge guides out of the path of the web when the presence of the web is sensed at the entrance of the thread path;

lowering the web edge guides to guide the web in a desired path when the web leading edge is sensed adjacent the vacuum take-up hub and before slipping the web relative to the hub so that the web is in the desired path position while being slipped on the hub.

8. The method of claim 7 and in addition the steps of:

stopping the take-up hub after a few wraps of web have been wound onto the hub;

activating a vacuum in a vacuum column in the path of the web whereby, as the web is unspooled, a loop of the web is loaded into the vacuum column.

9. Method for controlling the threading of a web through a circuitous path where the motive force for moving the web is the rotation of the web supply spool and where guidance of the web leading edge through the circuitous path is provided physically or pneumatically, said method comprising the steps of:

sensing when the web leading edge has left the spool and entered the path;

driving the spool forward at thread speed after sensing the web leading edge has entered the thread path to push the web as rapidly and reliably as possible through the circuitous path to a vacuum take-up hub;

sensing when the web leading edge is adjacent the vacuum take-up hub;

slipping the web relative to the hub after the web leading edge is adjacent the hub whereby the slipping movement of the web allows the web to straighten on the hub;

driving the take-up hub to wind a few wraps of the straightened web onto the vacuum take-up hub whereby the web is attached to the hub.

10. The method of claim 9 wherein the step of slipping the web comprises the steps of:

reversing the spool drive to pull the web backwards slowly after the web leading edge is adjacent the take-up hub;

rotating the take-up hub forward to slip the hub relative to the backward moving web whereby the web straightens itself on the hub.

* * * * *